(12) United States Patent
Puetz et al.

(10) Patent No.: US 11,698,534 B2
(45) Date of Patent: Jul. 11, 2023

(54) EYEGLASS LENS FOR AN OPTICAL IMAGING ELEMENT, AND AUGMENTED REALITY GLASSES

(71) Applicant: tooz technologies GmbH, Aalen (DE)

(72) Inventors: Joerg Puetz, Aalen (DE); Momchil Davidkov, Aalen (DE); Ramona Ettig, Lauchheim (DE); Georg Michels, Aalen (DE); Kai Bartel, Lorch (DE); Ersun Kartal, Aalen (DE)

(73) Assignee: tooz technologies GmbH, Aalen (DE)

( * ) Notice: Subject to any disclaimer, the term of this patent is extended or adjusted under 35 U.S.C. 154(b) by 31 days.

(21) Appl. No.: 17/460,102

(22) Filed: Aug. 27, 2021

(65) Prior Publication Data

US 2021/0389592 A1  Dec. 16, 2021

Related U.S. Application Data

(63) Continuation of application No. 16/085,985, filed as application No. PCT/EP2017/055730 on Mar. 10, 2017, now Pat. No. 11,131,853.

(30) Foreign Application Priority Data

Mar. 18, 2016 (DE) .......................... 102016105060.1

(51) Int. Cl.
*G02B 27/01* (2006.01)
*F21V 8/00* (2006.01)
*G02C 7/02* (2006.01)

(52) U.S. Cl.
CPC ....... *G02B 27/0172* (2013.01); *G02B 6/0055* (2013.01); *G02C 7/02* (2013.01); *G02B 2027/0178* (2013.01); *G02C 2202/16* (2013.01)

(58) Field of Classification Search
CPC .............. G02B 27/0172; G02B 6/0055; G02B 2027/0178; G02C 7/02; G02C 2202/16
See application file for complete search history.

(56) References Cited

U.S. PATENT DOCUMENTS 8,294,994 B1   10/2012  Kelly
8,472,119 B1 *  6/2013  Kelly .................. G02B 27/017
                                                      359/630

(Continued)

FOREIGN PATENT DOCUMENTS

JP         2002156600 A       5/2002
WO     WO-2015158833 A1 * 10/2015  ......... G02B 27/0172
WO        2016103251 A1       6/2016

OTHER PUBLICATIONS

Office Action to the corresponding European patent application rendered by the European Patent Office (EPO) dated Mar. 7, 2023, 4 pages.

(Continued)

*Primary Examiner* — Collin X Beatty
(74) *Attorney, Agent, or Firm* — Skaar Ulbrich Macari, P.A.

(57) ABSTRACT

An eyeglass lens for an optical imaging element for producing a virtual image of an initial image includes a main body and at least one complementary element mounted on the main body. The main body has a material with a first index of refraction $n_1$. A viscous or solid intermediate layer is arranged between the complementary element and the main body at least in the region where the complementary element overlaps with a reflection section of the main body. The material of the viscous or solid intermediate layer has a second index of refraction $n_2$ that satisfies the condition $n_2 < n_1 \sin(\theta_E)$. $\theta_E$ is an angle of incidence of the light beams of the imaging beam path proceeding from the incoupling section and incident on the reflection section, selected such (Continued)

that at least 50% of the light beams of the imaging beam path have an angle of incidence of $\theta > \theta_E$.

19 Claims, 6 Drawing Sheets

(56) References Cited

U.S. PATENT DOCUMENTS

| | | | |
|---|---|---|---|
| 9,348,143 B2* | 5/2016 | Gao | G02B 27/0176 |
| 2007/0070859 A1* | 3/2007 | Hirayama | G02B 27/0172 |
| | | | 369/112.04 |
| 2013/0242392 A1* | 9/2013 | Amirparviz | G02B 5/3025 |
| | | | 359/485.05 |
| 2014/0071539 A1* | 3/2014 | Gao | G02B 27/0172 |
| | | | 359/737 |
| 2016/0377868 A1* | 12/2016 | Ouderkirk | G02B 6/0046 |
| | | | 359/485.01 |
| 2019/0278086 A1* | 9/2019 | Ofir | G02B 27/0955 |

OTHER PUBLICATIONS

Office Action to the corresponding Japanese patent application rendered by the Japan Patent Office (JPO) dated Apr. 18, 2023, 8 pages (including English translation).

* cited by examiner

EYEGLASS LENS FOR AN OPTICAL IMAGING ELEMENT, AND AUGMENTED REALITY GLASSES

PRIORITY

This application is a continuation of U.S. patent application Ser. No. 16/085,985, which has a 371(c) date of Sep. 17, 2018 and an international filing date of Mar. 10, 2017, which claims the benefit of German Patent Application No. 10 2016 105 060.1, filed on Mar. 18, 2016, and wherein each of the foregoing are hereby incorporated herein by reference in their entirety.

FIELD

The present invention relates to a spectacle lens for an imaging optical unit for producing a virtual image of an initial image presented on an image generator. Additionally, the invention relates to smartglasses.

BACKGROUND

Smartglasses are a special form of a head-mounted display. A conventional form of head-mounted displays uses screens, which are worn in front of the eyes and which present to the user computer-generated images or images recorded by cameras. Such head-mounted displays are often bulky and do not allow direct perception of the surroundings. Head-mounted displays that are able to present to the user an image recorded with a camera or a computer-generated image without preventing the immediate perception of the surroundings have been developed in recent times. Such head-mounted displays, which are referred to as smartglasses below, facilitate the use of this technology in daily life.

Smartglasses can be provided in various ways. One type of smartglasses, which is distinguished by its compactness and aesthetic acceptance, in particular, is based on the principle of wave guidance in the spectacle lens. The portion of the spectacle lens effective for wave guidance is referred to as light guide below. Here, light generated by an image generator is collimated outside of the spectacle lens and input coupled via the end surface of the spectacle lens, from where it propagates in the light guide to in front of the eye by way of multiple reflections. An optical element situated there then output couples the light in the direction of the pupil of the eye. Input coupling into the spectacle lens and output coupling from the spectacle lens can be effected in a diffractive, reflective or refractive manner in this case. In the case of diffractive input or output coupling, use is made of diffraction gratings with approximately the same number of lines as input and output coupling elements, with the strongly dispersive effects of the individual gratings being compensated among themselves. By way of example, input and output coupling elements based on diffraction gratings are described in US 2006/0126181 A1 and in US 2010/0220295 A1. Examples of smartglasses with reflective or refractive input or output coupling elements are described in US 2012/0002294 A1.

In the case of a visual impairment/refractive error of the spectacle wearer, this is corrected, as a rule, by way of a spherical, toric or individually formed surface on the side facing the observer. In the case of smartglasses with optically effective surfaces of the light guide on the lens back side, the region individualized in this case includes said surfaces and hence causes a change in the surface properties required for data imaging. This leads to deterioration in the imaging quality of the input data, up to a destruction of the imaging. In principle, the same also applies to the glass front side, such as in the case of, e.g., FSP (front side progressive) spectacle lenses, or else in the case of lenses in which the optical correction is divided among the front and back surface.

Therefore, in order to ensure both the imaging quality and the individual corrective power of the back surface of the lens without adapting the optical design, i.e., the light guide, for each individual corrective effect, there is a need for output coupling such that the light, which contributes to the imaging, continues to be reflected at the required surface form and the light, which reaches the eye of the observer through the lens from the outside, can reach through the correction region unimpeded and therefore obtains the desired correction.

A second field of application, in which output coupling is required, lies in the combination of smartglasses with additional surface-near functions. By way of example, an absorption or polarization layer, or an absorber in the volume of the lens, is usually used for realizing a sunglasses function to reduce the intensity of sunlight reaching the eye of the user. This may also comprise adaptive systems, such as, e.g., photochromic layers, electro-optic systems, and more. However, the increased absorption leads to the unwanted side effect that the light that should facilitate the imaging of the display, too, is greatly reduced. Since, as a result of the reflections in the light guide, the light passes through the absorbing layer multiple times and at a relatively flat angle, the used light of the display is reduced even by a greater factor than the unwanted sunlight. Further examples of surface-near functions are volume holograms, holographic optical elements (HOEs), diffractive optical element (DOEs), engravings, coatings, stickers, prints, decorative elements, adornments or the like. Functional layers for spectacle lenses are described in, e.g., U.S. Pat. No. 6,231,183 B1.

WO 2015/158833 proposes to arrange an air gap or an angle-selective interference layer system between the light channel on the one hand and the front side or the back side on the other hand for the purposes of output coupling the light channel from the front and back side of the spectacle lens. By output coupling the light channel from the front and back side of the spectacle lens, the light channel is also protected from scratches, fingerprints, water droplets, etc., and consequently the impairment of the image transmission by ambient influences is also avoided.

However, the air gap and angle-selective interference layer system variants are technologically challenging. In the solution with the air gap, the greatest challenges lie in ensuring the mechanical stability and the long-term stability. The optical functions can be impaired by deformations, ambient influences, migration and diffusion of contaminants or constituent parts of the components, and dirtying. In the case of an angle-selective interference layer system, the technological challenge consists, in particular, in mass production (more than 100 individual layers are required) and in ensuring the mechanical and thermal stability.

SUMMARY

An object herein is providing an advantageous spectacle lens for an imaging optical unit for producing a virtual image. Another object is providing an advantageous imaging optical unit. A third object is providing a pair of advantageous smartglasses.

A spectacle lens as disclosed herein for an imaging optical unit for producing a virtual image of an initial image presented on an image generator comprises a main body and at least one complementary element attached to the main body. The at least one complementary element can be a coating, a film, an optical shaped part, an electro-optic system or the like in this case.

The main body, at least in a layer adjoining the at least one complementary element, can include a main body material with a first refractive index $n_1$. In particular, this refractive index $n_1$ can be constant over the entire main body. Then, in particular, the main body can include a uniform material. Moreover, the main body comprises an inner surface to face the eye, an outer surface to face away from the eye and a light guiding portion, wherein the light guiding portion extends between an input coupling portion for input coupling an imaging beam path between the inner surface and the outer surface and an output coupling structure for coupling the imaging beam path out of the main body. In the light guiding portion, the input coupled imaging beam path is guided to the output coupling structure by reflection at at least one reflection portion of the inner surface and/or of the outer surface.

The at least one complementary element is attached to the inner surface or the outer surface of the main body, wherein said at least one complementary element overlaps with at least one reflection portion of the inner surface and/or the outer surface of the main body. A viscous or solid intermediate layer is arranged between the at least one complementary element and the main body, at least in the overlap region of the at least one complementary element with the at least one reflection portion of the main body. Here, a viscous intermediate layer can have a high viscosity, i.e., be viscid, or have a low viscosity, i.e., be runny.

In the spectacle lens as disclosed herein, the material of the viscous or solid intermediate layer has a second refractive index $n_2$, which satisfies the condition $n_2 < n_1 \sin(\theta_E)$, where $\theta_E$ represents an angle of incidence of the light rays of the imaging beam path that emanate from the input coupling portion and that are incident on the at least one reflection portion, said angle of incidence being chosen in such a way that at least 50% of the light rays of the imaging beam path, in particular at least 75% of the light rays of the imaging beam path, have an angle of incidence $\theta > \theta_E$ on the at least one reflection portion. However, $\theta_E$ is preferably chosen in such a way that at least 90% of the light rays, more preferably at least 95% and ideally 100% of the light rays of the imaging beam path have an angle of incidence $\theta > \theta_E$ on the at least one reflection portion.

Preferably, the material of the viscous or solid intermediate layer moreover is chosen in such a way that it absorbs less than 20% of the light rays, in particular less than 5% of the light rays and preferably less than 1% of the light rays of the imaging beam path.

If the aforementioned condition is satisfied, the second refractive index $n_2$ is lower than the first refractive index $n_1$ in such a way that the critical angle for total internal reflection at the entire at least one reflection portion is less than the angle of incidence $\theta_E$ of the light rays of the imaging beam path that emanate from the input coupling portion and that are incident on the reflection portion. Here, the critical angle and the angle of incidence are measured from the surface normal at the respective point of the reflection portion of the inner or outer surface of the main body. The angle of incidence $\theta_E$ can be either the angle of incidence of a light ray emanating directly from the input coupling portion or the angle of incidence of a light ray emanating from the input coupling portion and already having been reflected in the light guiding portion by at least one reflection portion. In the case of a light ray that is incident into the spectacle lens from the surroundings and which is therefore not part of the imaging beam path, the angle of incidence at the reflection surface is less than the critical angle, and so such light rays are not subject to total internal reflection at the interface of the light guide to the intermediate layer and can pass through the spectacle lens.

Preferably, the aforementioned condition $n_2 < n_1 \sin(\theta_E)$ is satisfied in the entire wavelength range of the imaging beam path in order to obtain losses on account of transmission that are as low as possible. In addition or as an alternative thereto, the aforementioned condition $n_2 < n_1 \sin(\theta_E)$ is satisfied in the entire visible wavelength range in order to be able to produce a true-color virtual image. In some cases, however, in which a true-color image is not required, the condition $n_2 < n_1 \sin(\theta_E)$ else can be satisfied for only part of the visible wavelength range. In this case, the imaging beam path then also may be restricted to this part of the spectrum. However, depending on the application, the loss of a spectral part of the imaging beam path on account of transmission through a reflection portion also may be accepted.

By way of the viscous or solid intermediate layer, the light channel can be output coupled from the front and back side of the spectacle lens. Here, the intermediate layer can be produced more easily and has a higher stability, both thermally and mechanically, than an air gap or an interference layer system.

In an advantageous configuration of the spectacle lens, the at least one complementary element has a third refractive index, which corresponds to the first refractive index, and so an impairment by ambient light rays passing through the spectacle lens can be largely avoided. Within the scope of the present description, corresponding refractive indices should be understood to mean those indices that differ from one another by no more than 5 parts per thousand, preferably by no more than 1 part per thousand.

The viscous or solid intermediate layer need only be present in the region of the overlap of the at least one complementary element with the at least one reflection portion of the main body. However, from a production point of view, it is advantageous if the viscous or solid intermediate layer is present in the entire region in which the at least one complementary element is attached to the main body. This dispenses with the necessity of arranging intermediate layers with different materials in different contact regions. Moreover, the transition between the intermediate layers of different materials would be visible at the lateral boundary between the intermediate layers on account of the change in the refractive index as ambient light rays passing through the spectacle lens would be refracted differently by the intermediate layers. This is not necessarily bothersome if the boundary between the intermediate layers lies on the edge of the field of view. However, if the viscous or solid intermediate layer is present in the entire region in which the at least one complementary element is attached to the main body, the intermediate layer would only lead to a uniform refraction of all ambient light rays, which is not noticeable by the spectacle wearer and therefore does not have a bothersome effect.

The main body can comprise a surface layer, at least in the region of the light guiding portion. Here, the surface layer of the main body can comprise, for example, at least one layer, adjoining the viscous or solid intermediate layer, made of the material having the first refractive index or a material having a refractive index corresponding to the first refractive index.

By way of example, such a surface layer on at least one region of the light guiding portion renders it possible to fill the output coupling structure, including possibly present functional layers, which is often formed in the outer surface of the spectacle lens, for example as a Fresnel structure, without, on account of refractive index differences from the material of the main body, the filling deflecting the ambient light passing through the output coupling element. If the filling were to be carried out with the material of the viscous or solid intermediate layer, this filling would be visible on account of the refractive index that differs from the material of the main body and on account of the varying thickness of the filling and this filling would deflect the ambient light passing through the spectacle lens. As a result of the refractive-index-matched surface layer applied in the region of the output coupling portion, an outer surface of the light guiding portion with an optically plane surface can be ensured, and so the intermediate layer can form a layer with a uniform thickness on the optically plane surface. Then, the intermediate layer would only lead to a uniform refraction of all ambient light rays in the region in which it is present, said uniform refraction not being noticeable by the spectacle wearer and therefore not having a bothersome effect.

The surface layer of the main body can also include a plurality of layers, wherein the layers comprise materials whose refractive indices are greater than the second refractive index. The layer adjoining the viscous or solid intermediate layer then comprises the material having the first refractive index or a material having a refractive index corresponding to the first refractive index. The refractive indices of the layers increase proceeding from the layer adjoining the viscous or solid intermediate layer. In this way, the angle of incidence to the viscous or solid intermediate layer can be gradually increased, and so, when the imaging beam path enters the light guide, the entry angles into the light guide can be smaller than without the surface layer with the layers. The same effect can also be achieved if, instead of a surface layer with a number of layers, use is made of a surface layer made of a material with a refractive index gradient, wherein the lowest refractive index corresponds to the first refractive index and the surface layer is oriented in such a way that, with the lowest refractive index, it adjoins the viscous or solid intermediate layer.

A film with, e.g., a thickness in the range of 10 µm to 2 mm, preferably in the range of 100 µm to 1 mm and, in particular, in the range of 200 µm to 500 µm or a shaped part can be present between the viscous or the solid intermediate layer and the main body or between the viscous or the solid intermediate layer and the surface layer of the main body. Even though these need not necessarily have a refractive index corresponding to the first refractive index, it is advantageous if the refractive index of the film material corresponds to the first refractive index. The film can simplify the production of the spectacle lens to the extent that it can serve as a permanent or temporary form when curing the intermediate layer and it predetermines the geometry. A further advantage of a film can include the intermediate layer being able be applied to the film first and the film then being applied onto the surface layer of the main body. This moreover facilitates a greater material selection since the film can serve as an adhesion agent such that the material of the intermediate layer need not necessarily have good adhesion on the material of the surface layer or the material of the main body. A film also can be advantageous when using special UV-curing adhesives since the exposure may take place under the exclusion of oxygen in this case.

However, the material of the viscous or solid intermediate layer itself also can be an adhesive, by means of which, for example, the complementary element is fastened to the main body. Alternatively, there also is the option of the surface layer being an adhesive, by means of which the viscous or solid intermediate layer or a film, on which the intermediate layer is applied, is adhesively bonded to the main body. In principle, it is also possible for both the viscous or solid intermediate layer and the surface layer to be embodied as an adhesive.

As already described with reference to the film, the viscous or solid intermediate layer can be applied to a carrier material and then be attached to the main body together with the carrier material. However, the carrier material need not necessarily be a film. By way of example, the complementary element, too, can serve as a carrier material for the viscous or of solid intermediate layer.

The at least one reflection portion of the inner surface and/or of the outer surface of the main body can have a free form. Here, a free form should be understood to mean a surface that can be freely defined without having to be describable as spherical or toric or by any other regular geometry. In this way, the reflection portions of the light guiding portion can manipulate the imaging beam path such that they can adopt functions that co-form or correct the imaging. In the case of a free-form surface, $\theta_E$ should be chosen in such a way that at least 50% of the light rays of the imaging beam path, in particular at least 75% of the light rays of the imaging beam path, have an angle of incidence $\theta > \theta_E$ at each point of the free-form surface so as not to impair the effect of the free-form surface that co-forms or corrects the imaging. Preferably, $\theta_E$ is chosen in such a way here that at least 90% of the light rays, more preferably at least 95% and ideally 100% of the light rays of the imaging beam path have an angle of incidence $\theta > \theta_E$ at each point of the free-form surface. Here, it should be noted that the light rays of the imaging beam path are not necessarily completely collimated but instead may typically have a small divergence, wherein the output coupling structure, for example, then ensures a final collimation of the imaging beam path that is output coupled in the direction of the eye. By contrast, in the case of a pure reflection surface without a function that co-forms or corrects the imaging, there can be zones in which less than the required percentage of light rays have an angle of incidence $\theta > \theta_E$ for as long as the required percentage of the light rays over the entire reflection surface have an angle of incidence $\theta > \theta_E$. Here, the fewer light rays that have an angle of incidence $\theta > \theta_E$, the smaller the spatial size of the zones in which fewer than the required percentage of light rays have an angle of incidence $\theta > \theta_E$ should be in order to keep a spatial intensity variation in the virtual image under the perception threshold.

If the inner surface and/or the outer surface of the main body has a free form in the region of the light guiding portion but the spectacle lens should have an optically plane spherical surface on its outer side, this may lead to variations in the thickness of the viscous or solid intermediate layer. The perception of the surroundings through the spectacle lens can be impaired in the case of high curvatures of the free-form surfaces. In this case, it is advantageous if the viscous or solid intermediate layer has a uniform thickness and a capping layer is applied on the side of the viscous or solid intermediate layer facing away from the main body, said capping layer comprising a material having a fourth refractive index, wherein the fourth refractive index corresponds to the first refractive index, and the capping layer has an optically plane spherical surface on its side facing away from the viscous or solid intermediate layer.

An imaging optical unit can comprise at least one spectacle lens as disclosed herein.

A pair of smartglasses can include at least one imaging optical unit as disclosed herein.

The advantages that are obtainable with the imaging optical unit and the advantages that are obtainable with the smartglasses emerge immediately from the advantages obtained with the spectacle lens. Therefore, reference is made to these advantages.

Further features, properties and advantages of the present invention emerge from the following description of exemplary embodiments, with reference being made to the attached figures.

Figure 1:
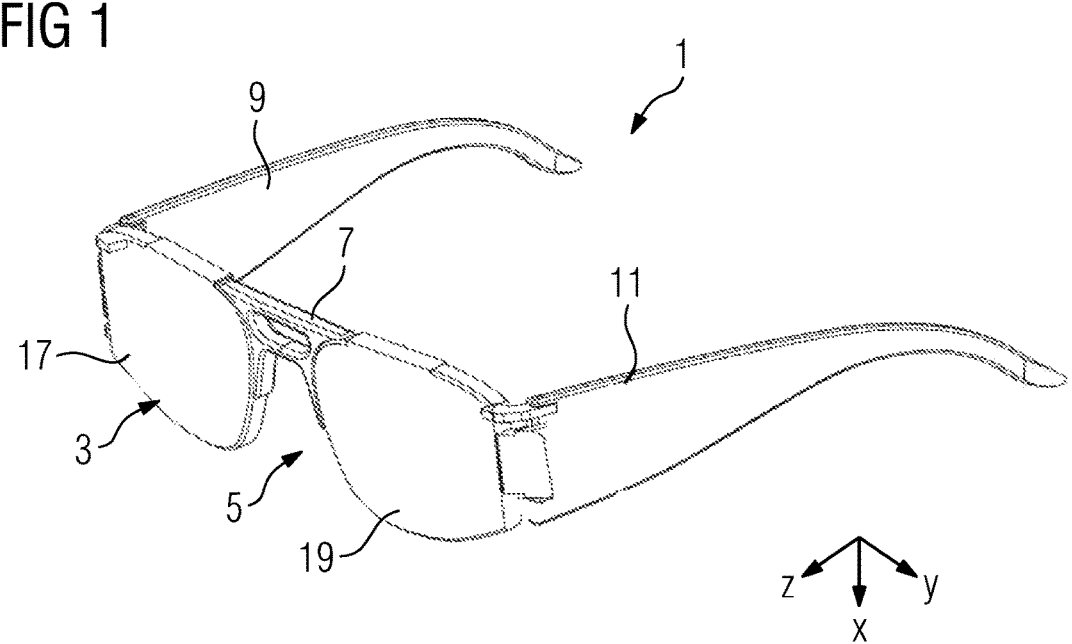
FIG. 1 shows a pair of smartglasses in a perspective illustration.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

The invention will be described below using the example of a pair of smartglasses with a spectacle lens according to the invention. The spectacle lens is part of an imaging optical unit for producing a virtual image of an initial image presented on an image generator. A corresponding pair of smartglasses 1 is shown in FIG. 1. The imaging optical unit with the spectacle lens 3 is illustrated highly schematically in FIG. 2.

The smartglasses 1 comprise two spectacle lenses 3, 5, which are held by a spectacle frame 7 with two spectacle earpieces 9, 11. The spectacle lenses each comprise a main body 41 which, when the glasses are worn, has an inner surface 13 (visible in FIG. 2) pointing toward the eye of the user and an outer surface 17, 19 (visible in FIGS. 1 and 2) pointing away from the eye of the user. In the present exemplary embodiment, an image generator 21 (shown in FIG. 2) is situated in the spectacle earpiece 9 or between the spectacle earpiece 9 and the spectacle lens 17, said image generator, for example, being able to be embodied as a liquid crystal display (LCD or LCoS-display, LCoS: Liquid Crystal on Silicon), as a display based on light-emitting diodes (LED display) or as a display based on organic light-emitting diodes (OLED display). An input coupling device 23, which has an input surface 24, a first mirror surface 27 and a second mirror surface 29 and which can be embodied as a prism made of glass or transparent plastic, with the entry surface 24 and the mirror surfaces 27, 29 being formed by surfaces of the prism, is arranged between the image generator 21 and the spectacle lens 3 as part of the imaging optical unit. Like the prism forming the input coupling device 23, the main body 41 of the spectacle lens 3 can be produced from an organic glass, i.e., a transparent plastic. However, the production from a mineral glass or any other transparent inorganic material is also possible. With the aid of the input coupling device 23, an imaging beam path emanating from the image generator can be input coupled between the inner surface 13 and the outer surface 17 of the main body via an input coupling portion 25 of the main body 41.

In the present exemplary embodiment, the block forming the input coupling device 23 and the spectacle lens 3 were formed as separate units and were subsequently cemented to one another. However, both units can also be produced as a monolithic component by shaping or by processing. Here, the black forming the input coupling device 23 and the spectacle lens 3 can be produced from the same material or from different materials.

In addition to input coupling the imaging beam path emanating from the image generator 21 into the spectacle lens 3, the input coupling apparatus 23 can also serve to collimate the divergent beams of the imaging beam path emanating from the pixels of the initial image presented by the image generator 21. To this end, the entry surface 24, the first mirror surface 27 and the second mirror surface 29 can have correspondingly curved surfaces. By way of example, the entry surface 24 can be embodied as an ellipsoid surface while the two mirror surfaces 27, 29 are each embodied as a hyperbolic surface. Together, the spectacle lens 3 and the input coupling device 23 form the imaging optical unit of the smartglasses 1, which produces a virtual image of the initial image presented on the image generator 21.

The imaging beam path collimated by means of the entry surface 24 and the two mirror surfaces 27, 29 is input coupled into the main body 41 between the inner surface 13 and the outer surface 17 by the input coupling device 23 via the input coupling portion 25 of the main body 41. In the main body 41, the imaging beam path then is guided by means of total internal reflection at the outer surface 17 and the inner surface 13 of the main body 41 to an output coupling structure which is embodied as a Fresnel structure 31 in the present case. The collimated imaging beam path is output coupled from the Fresnel structure 31 by virtue of being reflected in the direction of the inner surface 17 of the main body 41 in such a way that it emerges from the spectacle lens 3 therethrough in refractive fashion in the direction of the output pupil 33 of the imaging optical unit. When the smartglasses 1 are worn, the output pupil 33 is situated at the location of the pupil 35 of the user eye.

Figure 3:
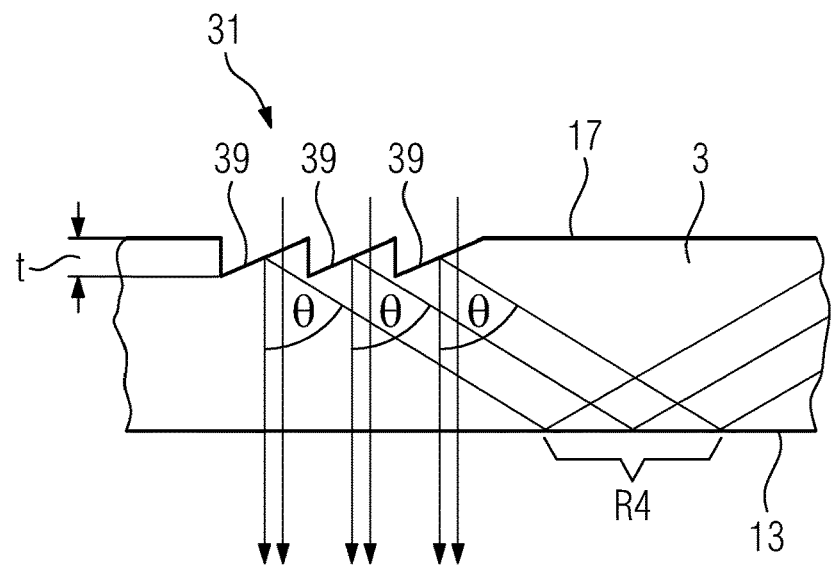
FIG. 3 shows an example of an output coupling structure in the spectacle lens.

An example of a Fresnel structure 31, as can find use in the imaging optical unit of the smartglasses 1, is described in FIG. 3. The shown Fresnel structure 31 has facets 39 which, in the present exemplary embodiment, are oriented in such a way that a zero ray of the imaging beam path incident on the facet 39 is reflected in the direction of the inner surface 17 of the main body 41. In the present exemplary embodiment, the facets 39 are partly mirrored, and so beams originating from the surroundings can pass the partly mirrored facets 39 in the direction of the output pupil 33. In this way, there is a beam path in the region of the output pupil 33, in which the imaging beam path has a beam path originating from the surroundings superimposed thereon such that a user with smartglasses 1 provided with the imaging optical unit is of the impression that the virtual image levitates in the surroundings.

On the path to the Fresnel structure 31, there are four instances of total internal reflection in the main body 41 after input coupling of the imaging beam path, the first of said total internal reflections occurring at a reflection portion R1 of the outer surface 17 of the main body 41, the second total internal reflections occurring at the reflection portion R2 of the inner surface 13 of the main body 41, the third total internal reflections occurring, again, at a reflection portion R3 of the outer surface 17 of the main body 41 and the fourth total internal reflections finally occurring, again, at a reflection portion R4 of the inner surface 13 of the main body 41. The Fresnel structure 31 is situated in the outer surface of the main body 41, the imaging beam path being reflected thereto by the fourth reflection portion R4. Then, as described, the imaging beam path is output coupled from the spectacle lens 3 in the direction of the output pupil of the imaging optical unit by means of the Fresnel structure 31. FIG. 3 shows a central ray and two marginal rays of a divergent beam emanating from the image generator 21. By the collimation by means of the input coupling apparatus 23, which forms a collimation optical unit, a largely collimated beam path is present in the spectacle lens 3, said collimated beam path then being output coupled by the Fresnel structure 31 as a largely collimated beam path.

In the present exemplary embodiment, the spectacle lens 3 comprises a complementary element in the form of a corrective lens 43 arranged at the main body 41, said corrective lens compensating a refractive error of the user of the smartglasses. The corrective lens 43, which, like the main body 41, can be produced from an organic glass or mineral glass, is attached to the main body 41 by means of an adhesive layer 45, which forms an intermediate layer between the main body 41 and the corrective lens 43. Here, the material of the main body has a first refractive index $n_1$ and the adhesive of the adhesive layer 45 has a second refractive index $n_2$. The material of the corrective lens has a refractive index which, in particular, may, but need not, correspond to the first refractive index $n_1$ of the main body material.

So that total internal reflection can occur at the inner surface 13 of the main body 41 that forms the interface of the main body 41 to the adhesive layer 45, the angle of incidence $\theta_E$ of the rays of the imaging beam path must, in relation to the surface normal of a surface element on which the total internal reflection should take place, be greater than the critical angle $\theta_G$ for the occurrence of a total internal reflection. Here, the critical angle is determined by the ratio of the first refractive index $n_1$, i.e., the refractive index of the material of the main body 41, to the second refractive index $n_2$, i.e., the refractive index of the adhesive 45 of the intermediate layer and it can be calculated from the equation $$\theta_G = \arcsin(n_2/n_1) \quad (1).$$

The angle of incidence $\theta_E$ of the rays of the imaging beam path on the reflecting surface element and the refractive index $n_1$ of the material of the main body 41 are known for a given design of the main body 41 and the input coupling device 23. So that total internal reflection can occur, the refractive index $n_2$ of the intermediate layer 45 formed by the adhesive now needs to be selected in such a way that the critical angle $\theta_G$ is less than the angle of incidence $\theta_E$. This is satisfied if the inequality $$n_2 < n_1 \sin(\theta_E) \quad (2)$$

is satisfied at the reflecting surface element. Since $\sin(\theta_E)$ is always less than or equal to 1, the second refractive index $n_2$ must therefore be less than the first refractive index $n_1$. Here, how much smaller than $n_1$ this has to be depends on the angle of incidence $\theta_E$ on the surface element—and hence on the design of the main body 41 and the input coupling device 23. Now, an angle of incidence $\theta_E$ is set within the scope of the invention, said angle of incidence being chosen in such a way that at least 50% of the light rays of the imaging beam path, in particular at least 75% of the light rays of the imaging beam path, have an angle of incidence $\theta > \theta_E$ at the reflection portion. In the present exemplary embodiment, the angle of incidence $\theta_E$ is chosen in such a way that at least 90% of the light rays, more preferably at least 95% and ideally 100% of the light rays of the imaging beam path have an angle of incidence $\theta > \theta_E$ at the reflection portion. The upper limit for a suitable refractive index $n_2$ is then established on the basis of the set angle of incidence $\theta_E$ with the aid of the inequality (2). Finally, a material with a suitable refractive index can be selected for the intermediate layer on the basis of the established refractive index $n_2$.

In the reflection portion, there can be zones in which less than 90% (or 50%, 75%, 95% or 100%) of the light rays of the imaging beam path have an angle of incidence $\theta > \theta_E$ for as long as 90% (or 50% 75%, 95% or 100%) of the light rays, as seen over the entire reflection portion, have an angle of incidence $\theta > \theta_E$ and the zones in which less than 90% (or 50%, 75%, 95% or 100%) of the light rays have an angle of incidence $\theta > \theta_E$ are kept so small spatially that spatial intensity variations in the virtual image either are not perceived or at least are not perceived as bothersome. Here, the zones in which less than 90% (or 50%, 75%, 95% or 100%) of the light rays have an angle of incidence $\theta > \theta_E$ can be spatially ever larger, the closer the proportion of light rays which have an angle of incidence $\theta > \theta_E$ lies to the required percentage in these zones.

Should the reflection portion be a free-form surface that co-forms or corrects the imaging, $\theta_E$ is chosen in such a way that at least 90% (or 50%, 75% or 95% or 100%) of the light rays of the imaging beam path have an angle of incidence $\theta > \theta_E$ at each point of the free-form surface so as not to impair the effect of the free-form surface that co-forms or corrects the imaging. Here, it should be noted that, as a rule, the light rays of the imaging beam path are not completely collimated but instead typically have a small divergence, which is removed by the output coupling structure, for example, by a final collimation of the imaging beam path that is output coupled in the direction of the eye.

In the present exemplary embodiment, the main body 41 comprises a glass with a first refractive index of $n_1=1.7$. The smallest angle of incidence $\theta_E$ is approximately 55° and the adhesive material of intermediate layer 45 has a second refractive index $n_2=1.3$. The critical angle for total internal reflection is consequently 49.9°, i.e., 50° in round figures. Consequently, it is clear that total internal reflection occurs at an angle of incidence of 55°. So that total internal reflection can occur at the angle of incidence 55°, the second refractive index $n_2$, i.e., that of the adhesive material according to equation 2, must not exceed a value of 1.39. A different upper limit for the refractive index $n_2$ of the adhesive material would arise in the case of other angles of incidence $\theta_E$ and/or in the case of a different refractive index $n_1$ of the main body material.

If a plurality of reflection portions in which total internal reflections should occur are present in an area of the main body 41 (in the present exemplary embodiment, total internal reflections occur in the reflection portions R2 and R4 of the inner surface 13), an angle of incidence $\theta_{E1}$, $\theta_{E2}$ is set for each reflection portion R2, R4, wherein the angles of incidence $\theta_{E1}$ and $\theta_{E2}$ are chosen in such a way that at least 75% of the light rays, preferably 90%, further preferably at least 95% and ideally 100% of the light rays of the imaging beam path have an angle of incidence $\theta > \theta_{E2}$ and $\theta > \theta_{E4}$, respectively, at the respective reflection portion R2, R4. For the purposes of establishing the refractive index $n_2$ of the material of the intermediate layer, the smallest of these angles of incidence $\theta_{E2}$, $\theta_{E4}$ is then chosen as the angle of incidence $\theta_E$ to be inserted into the inequality (2). This ensures that the established refractive index $n_2$ is suitable for each of the reflection portions.

Figure 2:
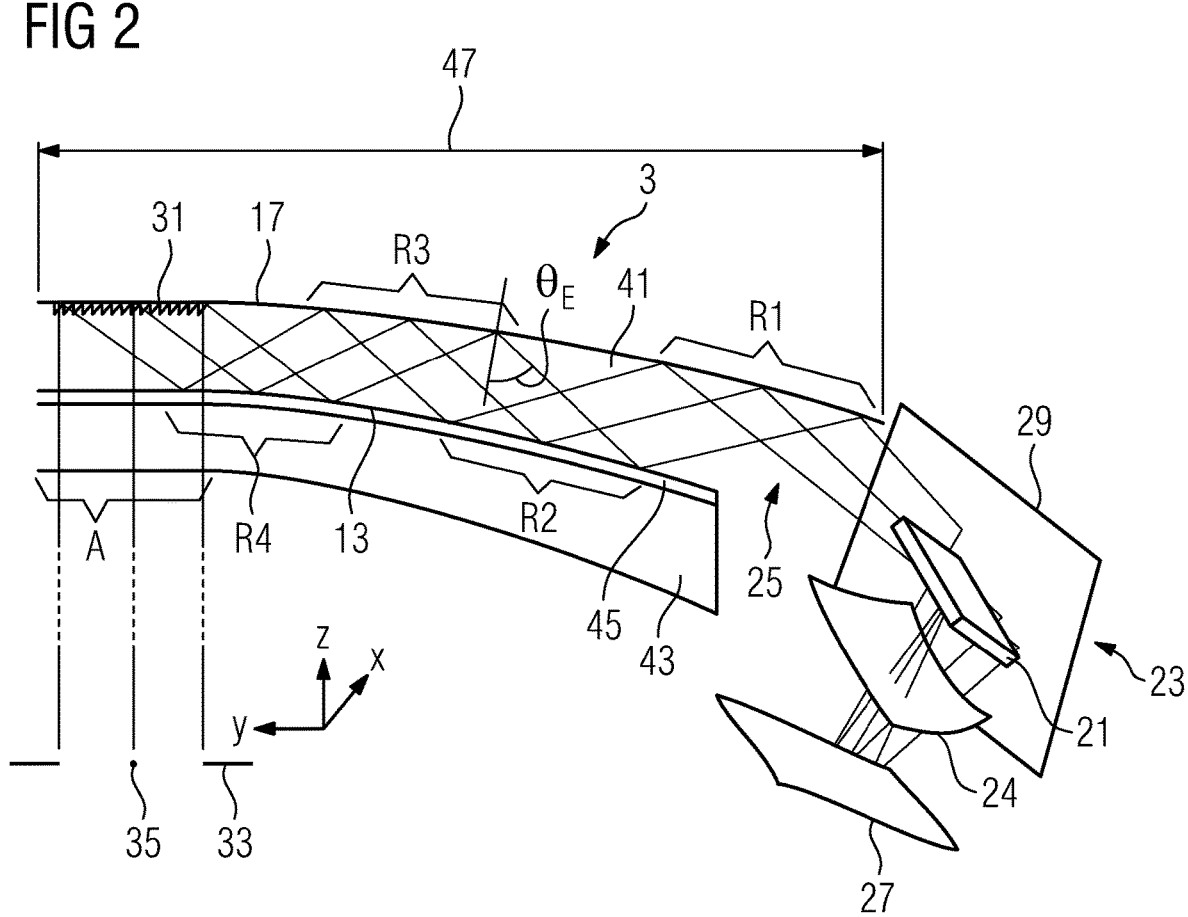
FIG. 2 shows a spectacle lens and an input coupling apparatus of the smartglasses from FIG. 1 in a schematic illustration.

The example of a spectacle lens according to the invention, described with reference to FIG. 2, is only equipped with a corrective lens 43 for correcting a refractive error, said corrective lens being fastened to the main body 41 by means of a layer 45 made of a low-refractive-index adhesive. However, in addition or as an alternative to the corrective lens 43, other complementary elements also can be attached to the main body 41. Examples of complementary elements that are not (organic or mineral) glasses are films or coatings that are applied to the main body 41. These may cover either the entire main body 41 or only parts thereof. Moreover, the complementary elements can satisfy different functions. By way of example, they can serve to prevent steaming up of the spectacle lens (anti-fog function), to tint or silver the glasses, to bring about a polarization or to bring about or modify a tint of the spectacle lens depending on the amount of incident UV light (for example, as a photochromic coating). Additionally, electrochromic layers (which modify the light transmission if a voltage is applied), electro-optic systems, signatures/engravings, diffractive optical elements (DOEs), holographic optical elements (HOEs) and adornment/decorative elements can be applied to the main body 41 as complementary elements. Naturally, there is also the option of combining a main body 41 with a plurality of the aforementioned complementary elements.

Exemplary materials for the main body 41 and/or for complementary elements made of glass are transparent organic or mineral glasses, wherein, in principle, use can also be made of crystalline or ceramic materials (e.g., oxides, halides) in addition to inorganic glass-like materials. In particular, transparent organic thermoplastics such as PC (polycarbonate), PMMA (polymethylmethacrylate), microcrystalline PA (polyimide) and COP/COC (cyclic olefin polymers and copolymers) and transparent thermosets, for example on the basis of acrylates, polyurethanes, polyureas, polythiourethanes and ADC (allyl diglycol carbonate) can be used as organic glasses.

In principle, structural adhesives or pressure-sensitive adhesives which have sufficient transparency in the relevant spectral range can be used as adhesives. Examples to this end are found in the group of acrylates, urethanes, epoxy/amines, epoxy/thiols and thiolenes, wherein the sulfur-containing materials are of interest, in particular for higher-refractive-index adhesives with refractive indices of greater than approximately 1.54.

In particular, fluoroacrylates and fluorourethaneacrylates should be mentioned from the class of low-refractive-index materials, by means of which refractive indices down to 1.32 can be realized, and LSR (liquid silicone rubber). These adhesives are particularly suitable as intermediate layer 45.

In the exemplary embodiment illustrated in FIG. 2, the adhesive layer 45 with the second refractive index $n_2$ is present at the entire contact surface between the main body 41 and the corrective lens 43. However, total internal reflection need only occur in the light guiding portion 47 of the main body 41, i.e., in the region between the input coupling portion 25 and the output coupling structure 31. Therefore, in principle, a different adhesive with a higher refractive index can also be used outside of this light guiding portion 47, in particular an adhesive with a refractive index corresponding to the first refractive index $n_1$ of the main body material. However, from a manufacturing point of view, it is advantageous if the same adhesive layer 45 is used on the whole contact surface. Furthermore, FIG. 2 shows that the corrective lens 43 extends up to the input coupling portion 25 of the main body 41. Should the corrective lens 43 not extend up to the input coupling portion 25 but, for example, only extend to a point between the reflection portions R2 and R4, the adhesive layer 45 need not extend up to the input coupling portion since the inner surface 13 of the main body 41 has a contact surface to the air with a refractive index of substantially 1.0 where the corrective lens 43 is not situated, and so the condition for total internal reflection is satisfied in this region, even without an adhesive layer.

Examples of spectacle lenses with different configurations of the low-refractive-index intermediate layers are described below with reference to FIGS. 4 to 12.

Figure 4:
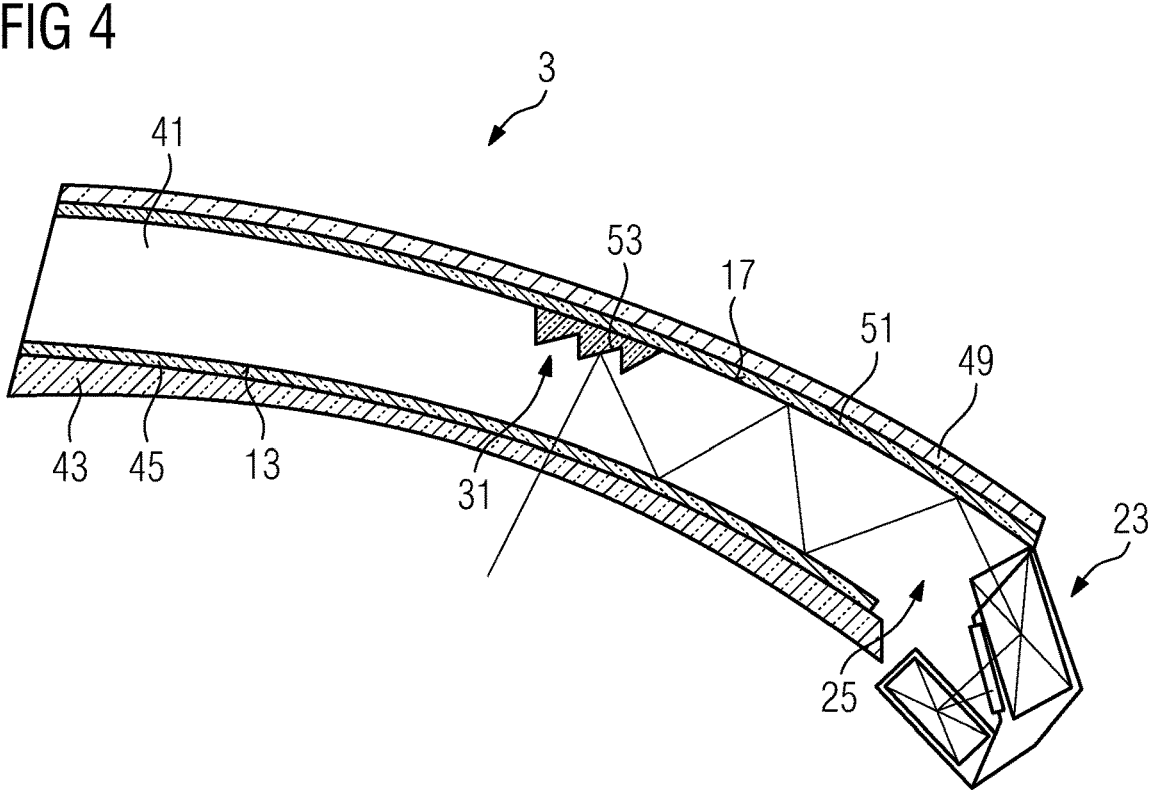
FIGS. 4 to 12 show examples of variants of spectacle lenses according to certain example embodiments of the invention.

FIG. 4 shows a spectacle lens in which, in addition to corrective lens 43 at the inner side of the main body 41, a thin film 49 is applied as a complementary element to the outer surface 17 of the main body 41. Like the corrective lens 43, the film 49 is affixed to the main body 41 by means of an adhesive layer 51. The adhesive of the adhesive layer 51 has a refractive index $n_2$, which is chosen according to equation 2 and which consequently leads to total internal reflection of an imaging beam path, input coupled into the main body 41 by the input coupling portion 25, at the outer surface 7 of the main body 41.

In the region of the output coupling structure 31, which is formed by a Fresnel structure as shown in FIG. 3, a filling 53 with a filler material whose refractive index corresponds to the first refractive index $n_1$, i.e., the refractive index of the main body material, is situated between the surface of the Fresnel structure and the intermediate layer formed by the adhesive layer 51. By adapting the refractive index of the filler material to the refractive index $n_1$ of the main body material, it is possible to avoid the output coupling structure 31 being visible in the ambient light passing therethrough and consequently producing a bothersome visual impression.

By way of example, the film 49 can be a sunglasses component, which has an absorbing, reflecting or polarizing coating or color for reducing the transmission through the spectacle lens 3. Here, the coating or color can be present already before adhesive bonding the film 49 to the main body 41 or it can be applied thereto or introduced therein after adhesively bonding the film 49 to the main body 41.

Figure 5:
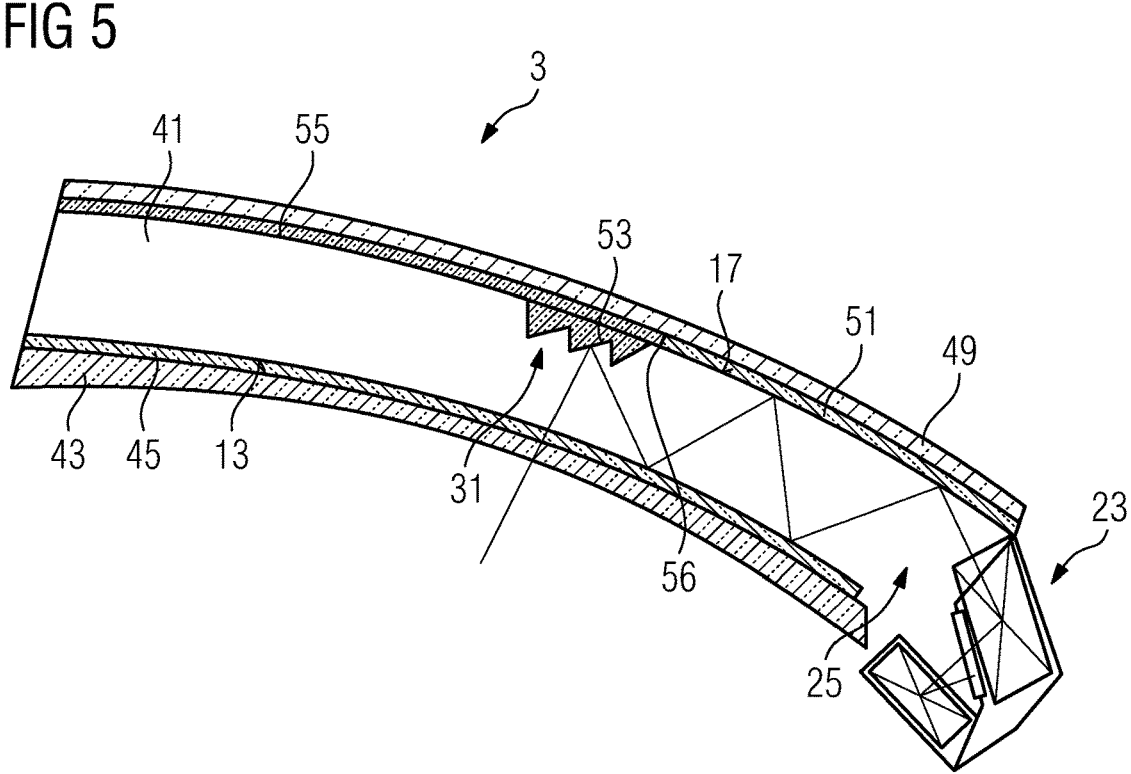

A development of the embodiment variant shown in FIG. 4 is illustrated in FIG. 5. The development differs from the variant illustrated in FIG. 4 in that the adhesive layer, with which the film 49 is fastened to the main body 41, is divided in two. In the light guiding portion, i.e., in the region between the output coupling structure 31 and the input coupling portion 25, use is made of the same adhesive as in the embodiment variant described in FIG. 4. Therefore, in the region of the light guiding portion, the adhesive layer corresponds to the adhesive layer 51 from FIG. 4. By contrast, beyond the output coupling structure 31, use is made of an adhesive layer 55 with an adhesive that also serves as filler for the Fresnel structure. This adhesive has a refractive index that is matched to the first refractive index $n_1$. Although the separating line 56 between the two adhesives may be visible in this variant, this separating line 56, as a rule, is situated outside the central field of view, and so it does not appear particularly bothersome for the spectacle wearer.

Figure 6:
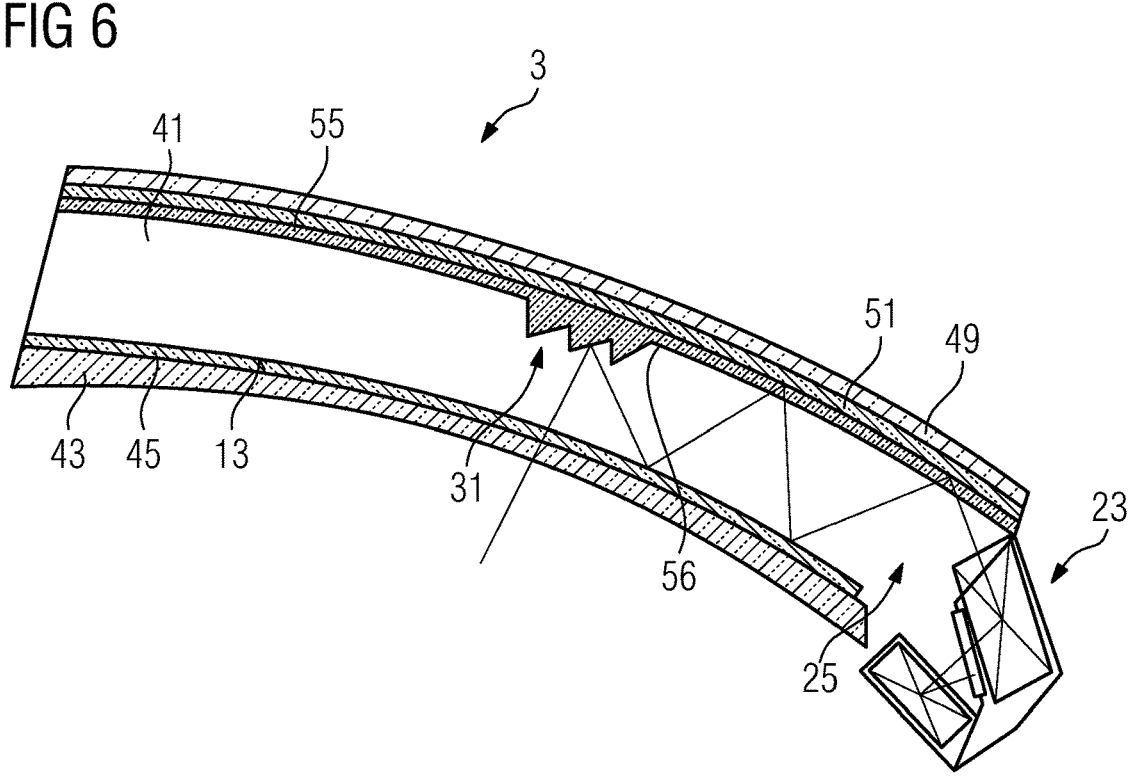

A further development of the embodiment variant illustrated in FIG. 4 is shown in FIG. 6. In this embodiment variant, the adhesive layer 55 with the refractive-index-matched adhesive extends over the entire outer surface of the main body 41. On account of the fact that the refractive index of the refractive-index-matched adhesive is matched to the refractive index $n_1$ of the main body material, this layer does not impede looking through the spectacle lens 3. Then, the adhesive layer 51 made of the adhesive with the second refractive index $n_2$ is arranged over the adhesive layer 55 with the refractive-index-matched adhesive. Since the refractive index of the refractive-index-matched adhesive layer 55 corresponds to the refractive index of the main body material, the interface between the refractive-index-matched adhesive layer 55 and the adhesive layer 51 with the second refractive index $n_2$ has substantially the same critical angle $\theta_G$ as the interface, present in FIG. 4, between the main body 41 and the adhesive layer 51. On account of matching the refractive index of the adhesive layer 55 to the refractive index $n_1$ of the main body material 41, this refractive-index-matched adhesive layer 55 therefore can be considered to be part of the main body 41 in terms of its optical behavior. It should be noted here that the refractive indices that are matched to one another differ from one another by no more than 5 parts per thousand, preferably by at most 1 part per thousand, as already mentioned previously. These differences lead to small deviations in the critical angles $\theta_G$ which are established in accordance with equation 1 for the interface between the refractive-index-matched adhesive layer 55 and the adhesive layer 51 with the second refractive index $n_2$ on the one hand and for the interface between the main body 41 and the adhesive layer 51 with the second refractive index $n_2$ on the other hand. However, these small deviations can be neglected within the scope of the invention, and so these critical angles can be considered to be the same within the scope of the invention.

In FIG. 6, the adhesive layer 51 extends over the entire refractive-index-matched adhesive layer 55. However, there is also the option of providing the adhesive layer 51 only in the light guiding portion of the spectacle lens 3, i.e., in the spectacle lens portion extending between the input coupling portion 25 and the output coupling structure 31. Then, in the remaining portions, the refractive-index-matched adhesive layer 55 would be thicker than in the light guiding portion in order to compensate the thickness of the adhesive layer with the second refractive index $n_2$ that is additionally present in the light guiding portion. Although the lateral separating line between the two adhesives may also be visible in the ambient light passing through the spectacle lens 3 in this variant, this separating line, like the separating line 56 in FIG. 5, is situated, as a rule, outside the central field of view, and so it is not perceived as particularly bothersome by the spectacle wearer.

Figure 7:
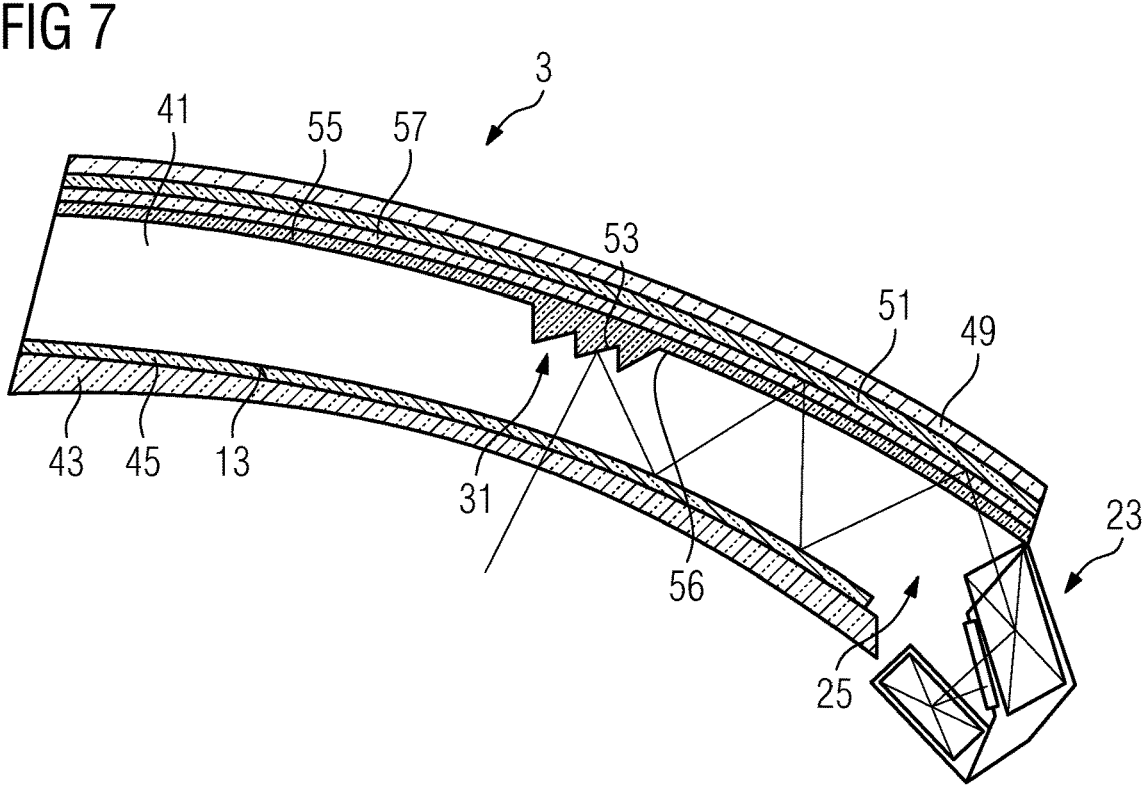

In FIG. 6, the adhesive layer 51 with the second refractive index $n_2$ is applied directly to the refractive-index-matched adhesive layer 55. However, there is also the option for a film 57 to be situated between the refractive-index-matched adhesive layer 55 and the adhesive layer 51 with the second refractive index $n_2$, as illustrated in FIG. 7. The film 57 need not necessarily have a refractive index that is matched to the refractive index of the refractive-index-matched adhesive layer 55. If the refractive index of the film 57 differs from the refractive index of the refractive-index-matched adhesive layer 55 and if it has a uniform thickness like in the present example, this only leads to refraction with a uniform effect over the entire layer, and so the visual perception is not impaired. However, in the case of the film 57, the condition for the occurrence of the total internal reflection at the interface between the film 57 and the adhesive layer 51 with the second refractive index $n_2$ having to be satisfied applies. However, the film 57 may also be matched to the refractive index of the adhesive layer 55 lying therebelow and hence to the first refractive index $n_1$. In this case, the critical angle $\theta_G$ equals the critical angle of the interface between the main body 41 and the adhesive layer 51 from FIG. 4.

The film 57 facilitates a larger selection of material combinations since it may serve as an adhesion imparting layer if the adhesive of the refractive-index-matched adhesive layer 55 and the adhesive of the layer 51 with the second refractive index $n_2$ only adhere poorly to one another. Moreover, the film offers advantages from a production point of view since at least the adhesive layer 51 with the second refractive index $n_2$ can be applied to the film 57 before the latter is applied to the refractive-index-matched adhesive layer 55. The film can simplify the production of the spectacle lens to the extent that it can serve as a form when curing the intermediate layer and it predetermines the geometry. It would also be conceivable to use this film for curing only and to remove it thereafter. In this case, the surface of the film is treated in such a way that it can easily be detached from the intermediate layer again. Moreover, it is possible also to already apply the functional layer 49 (in the form of a further film or in the form of a coating) on to the adhesive layer 51 with the second refractive index $n_2$ before the entire layer system is applied to the refractive-index-matched adhesive layer 55. In addition or as an alternative thereto, there is the option of applying the refractive-index-matched adhesive layer 55 onto the film 57 in advance and subsequently adhesively bonding the film 57 to the main body 41 with the aid of the refractive-index-matched adhesive layer 55. In a further alternative, adhesive can be applied to both components, i.e., the film 57 and the main body 41, with the components then subsequently being joined.

Figure 8:
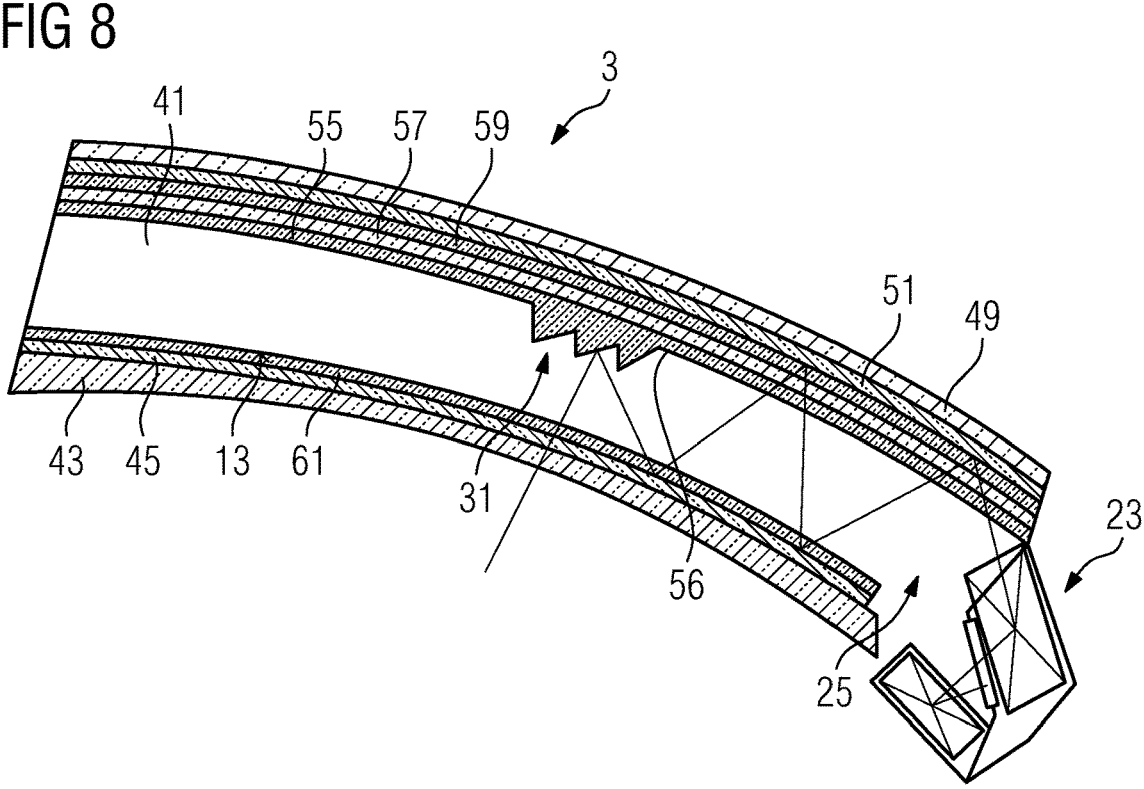

FIG. 8 shows a variant of the spectacle lens 3, in which the adhesive layer 51 with the low-refractive-index adhesive is adhesively bonded to the film 57 as a carrier material with the aid of a further adhesive layer 59, which comprises an adhesive with an adhesive whose refractive index is matched to the refractive index $n_1$ of the main body material. The film 57 itself is adhesively bonded, in turn, to the main body 41 via an adhesive layer 55 with an adhesive whose refractive index is matched to the refractive index of the main body material. Here, the adhesive layer 55 also serves to fill the Fresnel structure 31. This can be advantageous, in particular, if the low-refractive-index adhesive cannot readily be applied to the main body 41 and/or the film 57 on account of its chemical composition, its viscosity, its curing times, its curing method, its solidity in the cured state or other properties. Accordingly, an adhesive layer 61 whose refractive index is matched to the refractive index of the main body material is also arranged in FIG. 8 between the main body 41 and the adhesive layer 45 with the low-refractive-index adhesive that adjoins the corrective lens 43.

Figure 9:
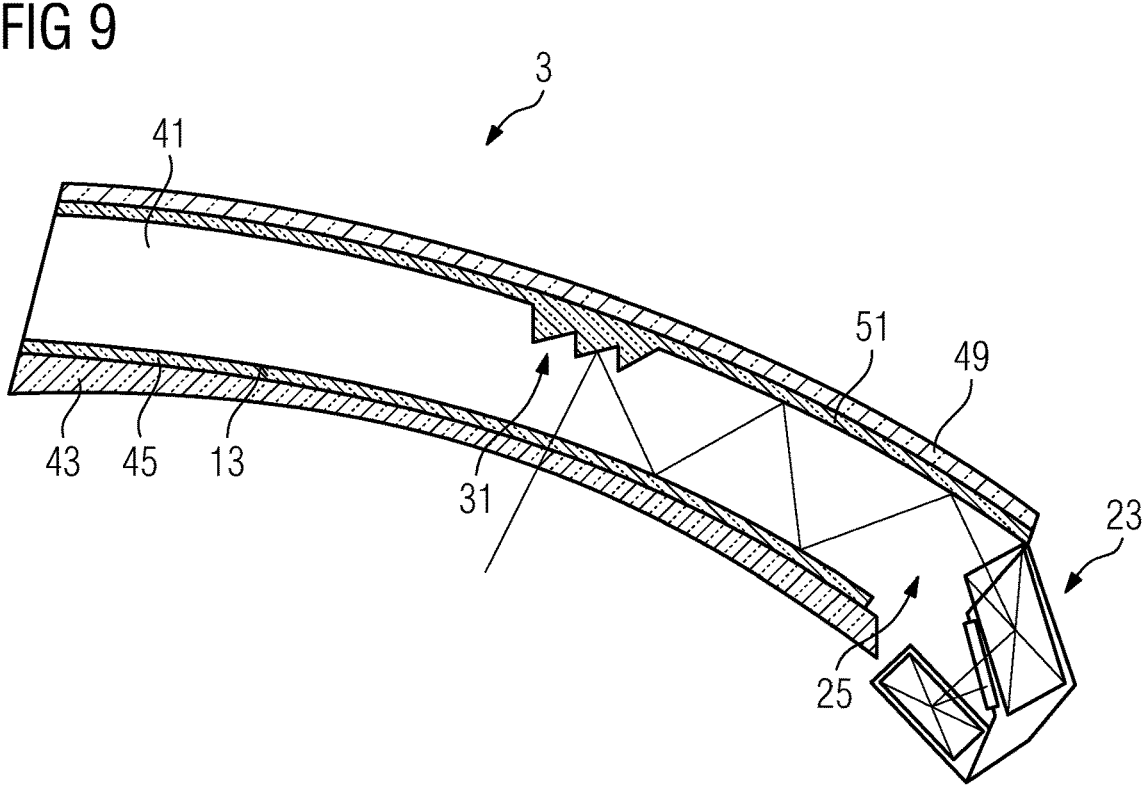

A further embodiment variant for a spectacle lens 3 according to the invention is shown in FIG. 9. This embodiment variant differs from the embodiment variant shown in FIG. 4 in that the adhesive layer 51 with the low-refractive-index adhesive is applied directly to the surface of the main body 41 and in that the low-refractive-index adhesive is also used to fill the Fresnel structure 31. Then, the film 49 forming the functional element is applied to the low-refractive-index adhesive. The view through the spectacle lens 3 is impaired by the variations in the thickness of the low-refractive-index adhesive layer 51 in the region of the Fresnel structure 31. However, if the Fresnel structure 31 is arranged in a region of the main body 41 which lies outside of the central field of view when the eye looks straight ahead, this is not, or hardly, bothersome. However, the quality of the virtual image is not impaired in the variant illustrated in FIG. 9.

Figure 10:
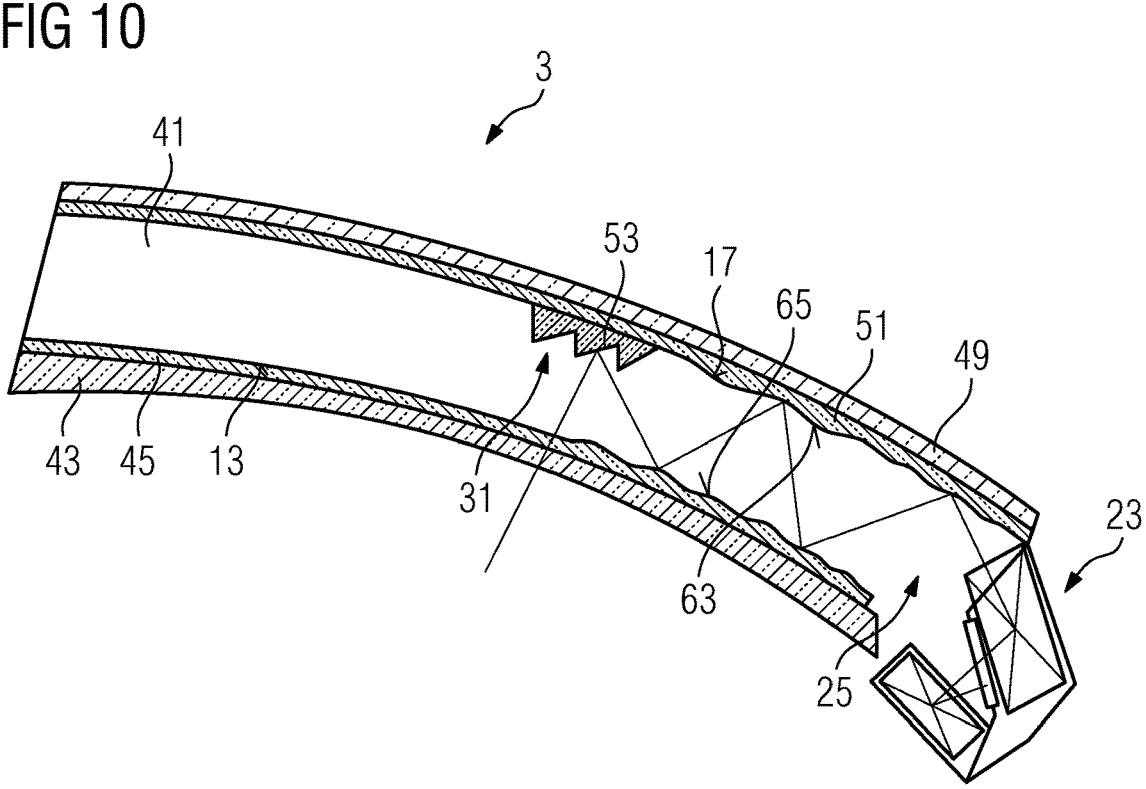
Figure 11:
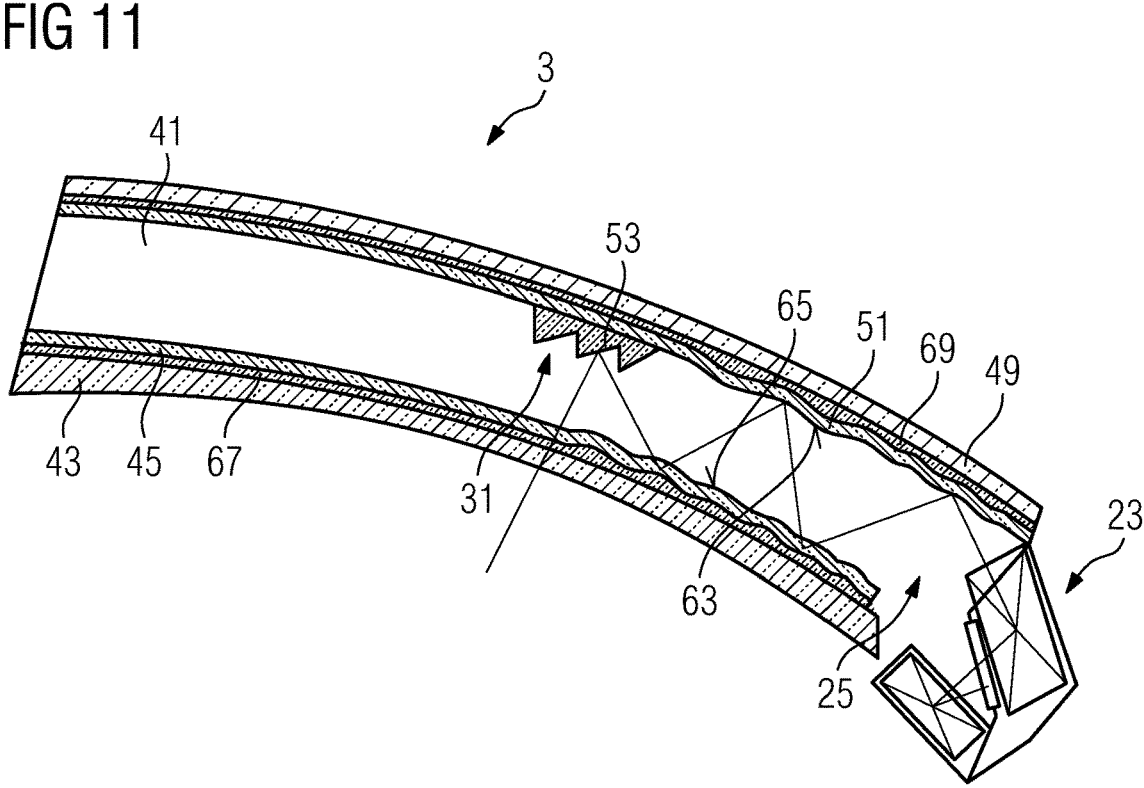

FIG. 10 illustrates a spectacle lens 3, in which the inner surface 13 and the outer surface 17 have free-form surfaces 63 and 65 in the region of the light guiding portion, i.e., between the input coupling portion 25 and the output coupling structure 31, wherein the depressions in the surfaces arising on account of the free-form surfaces 63, 65 are filled by means of the adhesive layers 45 and 51 made of the low-refractive-index adhesive such that a spherical surface arises, on which the corrective lens 43 and the film 49 that forms a functional element can be applied. In the case of very strong curvatures in the region of the free-form surfaces 63, 65, however, it may be expedient to apply the adhesive layer 45, 51 with the low-refractive-index adhesive with a uniform thickness and to fill the depressions in the region of the free-form surfaces with additional adhesive layers 67, 69 made of an adhesive with a refractive index that is matched to the refractive index of the main body material, as illustrated in FIG. 11. This allows impairments in the view through the spectacle lens on account of varying thicknesses of the adhesive layer with the low-refractive-index adhesive to be minimized.

Figure 12:
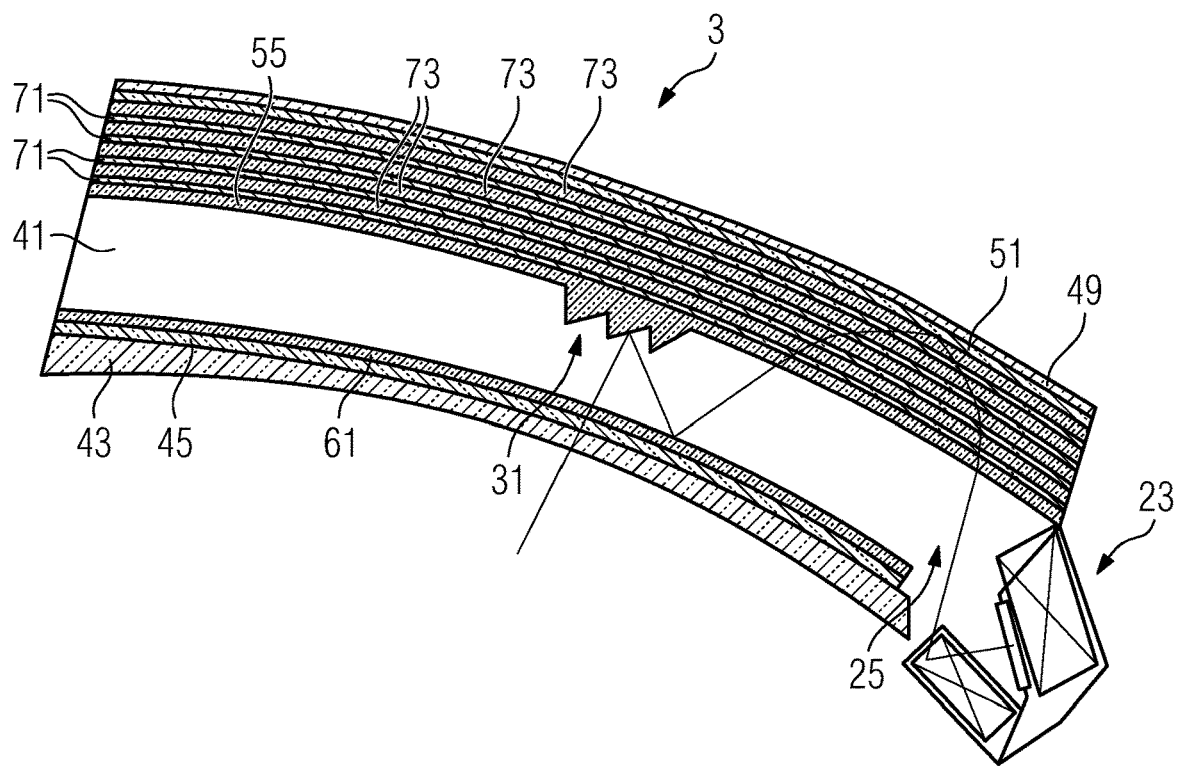

An even further embodiment variant of the spectacle lens 3 according to the invention is illustrated in FIG. 12. In this embodiment variant, light is refracted by a sequence of films 71 and adhesives 73, the materials of which have different refractive indices that increase toward the main body 41. It is possible to obtain an increase in the angle of incidence $\theta_E$ on the interface to the adhesive layer 51 with the aid of light refraction. Since the angle of incidence $\theta_E$ on the interface to the adhesive layer 51 with the low-refractive-index adhesive is increased by the sequence of films 71 and adhesive layers 73, the requirements on the employed adhesive can be reduced as larger critical angles $\theta_G$ can be admitted and, therefore, adhesives with higher refractive indices can be used. The selection of possible adhesives for producing the adhesive layer 51 with the low-refractive-index adhesive is increased by favoring the total internal reflection at the adhesive layer 51 with the low-refractive-index adhesive. Instead of the described sequence of films and adhesives, materials with refractive index gradients for increasing the angle of incidence $\theta_E$ may also be used in this embodiment variant.

The present invention was described in detail on the basis of exemplary embodiments, with reference being made to the attached figures for explanation purposes. However, the exemplary embodiments should only provide concepts for realizing the invention to a person skilled in the art and should not restrict the invention to the illustrated exemplary embodiments. As already described at various points in the exemplary embodiments, there can be deviations from the described exemplary embodiments within the scope of the invention. By way of example, there can be refractive output coupling or diffractive output coupling instead of reflective output coupling, as described in the exemplary embodiments. The principle of refractive output coupling is described in, for example, DE 10 2014 115 341, reference being made thereto in view of the basic design of refractive output coupling structures. Further examples of reflective or refractive output coupling structures are also described in US 2012/0002294 A1, reference likewise being made thereto. Moreover, reference is made to US 2006/0126181 A1 and US 2010/0220295 A1 in respect of output coupling structures that are based on diffraction gratings. Furthermore, the corrective lens need not be arranged on the inner surface of the main body; instead, it can be arranged on the outer surface of the main body. Moreover, it is possible to divide the corrective effect between two corrective lenses, one of which is arranged on the inner surface and the other of which is arranged on the outer surface of the main body. A corresponding statement also applies to other functional elements which are suitable as complementary elements on the main body. Moreover, the features of the individual exemplary embodiments can be combined with one another. Therefore, the present invention should only be restricted by the attached claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A spectacle lens for an imaging optical unit that produces a virtual image of an initial image presented on an image generator, the spectacle lens comprising:
    a main body, comprising:
        an inner surface to face an eye of a user;
        an outer surface to face away from the eye;
        a light guiding portion, which extends between an input coupling portion for input coupling an imaging beam path between the inner surface and the outer surface; and
        an output coupling structure for coupling the imaging beam path out of the main body,
        wherein the light guiding portion guides the imaging beam path from the input coupling portion to the output coupling structure by reflection at at least one of a reflection portion of the inner surface and a reflection portion of the outer surface; and
    at least one complementary element attached to the main body, the at least one complementary element comprising a refractive corrective element located at the inner surface of the main body, and overlapping with at least one reflection portion of the inner surface of the main body, wherein the main body comprises, at least in a layer adjoining the at least one complementary element, a material with a first refractive index $n_1$, wherein a viscous or solid intermediate layer is arranged between the at least one complementary element and the main body, at least in the overlap region of the at least one complementary element with the at least one reflection portion of at least one of the inner surface and the outer surface of the main body, wherein the viscous or solid intermediate layer comprise a material that has a second refractive index $n_2$, which satisfies the condition $n_2 < n_1 \sin(\theta_E)$, where $\theta_E$ represents an angle of incidence of the light rays of the imaging beam path that emanate from the input coupling portion and that are incident on the reflection portion, the angle of incidence selected such that at least 50% of the light rays of the imaging beam path have an angle of incidence $\theta > \theta_E$.

2. The spectacle lens of claim 1, wherein the angle of incidence $\theta_E$ is selected such that at least 75% of the light rays of the imaging beam path have an angle of incidence $\theta > \theta_E$.

3. The spectacle lens of claim 1, wherein the condition $n_2 < n_1 \sin(\theta_E)$ is satisfied in the entire wavelength range of the imaging beam path.

4. The spectacle lens of claim 1, wherein the condition $n_2 < n_1 \sin(\theta_E)$ is satisfied in the entire visible wavelength range.

5. The spectacle lens of claim 1, wherein the material of the viscous or solid intermediate layer absorbs less than 20% of the light rays of the imaging beam path.

6. The spectacle lens of claim 1, wherein the at least one complementary element has a third refractive index that does not differ from the first refractive index by more than 5 parts per thousand.

7. The spectacle lens of claim 1, wherein the at least one complementary element has a third refractive index that does not differ from the first refractive index by more than 1 part per thousand.

8. The spectacle lens of claim 1, wherein the viscous or solid intermediate layer is present in the entire region in which the at least one complementary element is attached to the main body.

9. The spectacle lens of claim 1, wherein the main body comprises a surface layer at least on a region of the light guiding portion.

10. The spectacle lens as claimed in claim 9, wherein the surface layer of the main body comprises at least one layer, adjoining the viscous or solid intermediate layer, formed of a material having a refractive index that does not differ from the first refractive index by more than 5 parts per thousand.

11. The spectacle lens as claimed in claim 10,
wherein the surface layer of the main body comprises a plurality of layers,
wherein each of the plurality of layers comprise materials whose refractive indices are greater than the second refractive index $n_2$,
wherein the layer adjoining the viscous or solid intermediate layer comprises the material having the refractive index that does not differ from the first refractive index $n_1$ by more than 5 parts per thousand, and
wherein the refractive indices of each of the plurality of layers increases proceeding from the layer adjoining the viscous or solid intermediate layer.

12. The spectacle lens of claim 9, wherein a film or a shaped part is disposed between the viscous or solid intermediate layer and the main body or between the viscous or the solid intermediate layer and the surface layer of the main body.

13. The spectacle lens of claim 9, wherein at least one of the viscous or solid intermediate layer and/or the material of the surface layer comprise an adhesive.

14. The spectacle lens of claim 1, wherein the material of the viscous or solid intermediate layer is applied to a carrier material, which is applied to at least one of the inner surface and the outer surface of the main body.

15. The spectacle lens of claim 1, wherein the at least one reflection portion of the inner surface or of the outer surface of the main body comprises a free form.

16. An imaging optical unit for producing a virtual image of an initial image presented on an image generator, comprising at least one spectacle lens as claimed in claim 1.

17. A pair of smartglasses, comprising at least one imaging optical unit as claimed in claim 16.

18. A spectacle lens for an imaging optical unit that produces a virtual image of an initial image presented on an image generator, the spectacle lens comprising:
a main body, comprising
an inner surface to face the eye;
an outer surface to face away from the eye and a light guiding portion, which extends between an input coupling portion for input coupling an imaging beam path between the inner surface and the outer surface; and
an output coupling structure for coupling the imaging beam path out of the main body and in which light guiding portion the input coupled imaging beam path is guided to the output coupling structure by reflection at at least one of a reflection portion of the inner surface and a reflection portion of the outer surface; and
at least one complementary element attached to the main body, the at least one complementary element comprising a refractive corrective element located at the inner surface of the main body, and overlapping with at least one reflection portion of the inner surface of the main body,
wherein the main body comprises, at least in a layer adjoining the at least one complementary element, a material with a first refractive index $n_1$,
wherein a viscous or solid intermediate layer is arranged between the at least one complementary element and the main body, at least in the overlap region of the at least one complementary element with the at least one reflection portion of at least one of the inner surface and the outer surface of the main body,
wherein the viscous or solid intermediate layer comprise a material that has a second refractive index $n_2$, which satisfies the condition $n_2 < n_1 \sin(\theta_E)$, where $\theta_E$ represents an angle of incidence of the light rays of the imaging beam path that emanate from the input coupling portion and that are incident on the reflection portion, the angle of incidence selected such that at least 50% of the light rays of the imaging beam path have an angle of incidence $\theta > \theta_E$,
wherein the main body comprises a surface layer at least on a region of the light guiding portion,
wherein the surface layer of the main body comprises a material with a refractive index gradient,
wherein a lowest refractive index of the refractive index gradient does not differ from the first refractive index $n_1$ by more than 5 parts per thousand, and wherein the surface layer is oriented such that, with the lowest refractive index, the surface layer adjoins the viscous or solid intermediate layer.

19. A spectacle lens for an imaging optical unit that produces a virtual image of an initial image presented on an image generator, the spectacle lens comprising:
   a main body, comprising
      an inner surface to face the eye;
      an outer surface to face away from the eye and a light guiding portion, which extends between an input coupling portion for input coupling an imaging beam path between the inner surface and the outer surface; and
      an output coupling structure for coupling the imaging beam path out of the main body and in which light guiding portion the input coupled imaging beam path is guided to the output coupling structure by reflection at at least one of a reflection portion of the inner surface and a reflection portion of the outer surface; and
   at least one complementary element attached to the main body, the at least one complementary element comprising a refractive corrective element located at the inner surface of the main body, and overlapping with at least one reflection portion of the inner surface of the main body,
   wherein the main body comprises, at least in a layer adjoining the at least one complementary element, a material with a first refractive index $n_1$,
   wherein a viscous or solid intermediate layer is arranged between the at least one complementary element and the main body, at least in the overlap region of the at least one complementary element with the at least one reflection portion of the inner surface of the main body,
   wherein the viscous or solid intermediate layer comprise a material that has a second refractive index $n_2$, which satisfies the condition $n_2 < n_1 \sin(\theta_E)$, where $\theta_E$ represents an angle of incidence of the light rays of the imaging beam path that emanate from the input coupling portion and that are incident on the reflection portion, the angle of incidence selected such that at least 50% of the light rays of the imaging beam path have an angle of incidence $\theta > \theta_E$,
   wherein the at least one reflection portion of the inner surface or of the outer surface of the main body comprises a free form,
   wherein the viscous or solid intermediate layer has a uniform thickness,
   wherein a capping layer is disposed on a side of the viscous or solid intermediate layer facing away from the main body,
   wherein the capping layer comprises the material of the main body or a material having a fourth refractive index,
   wherein the fourth refractive index does not differ from the first refractive index $n_1$ by more than 5 parts per thousand, and
   wherein the capping layer has an optically plane spherical surface on a side thereof that faces away from the first intermediate layer.

* * * * *